(12) United States Patent
Kwon et al.

(10) Patent No.: US 12,490,247 B2
(45) Date of Patent: Dec. 2, 2025

(54) METHOD AND APPARATUS FOR TRANSMITTING CHANNEL INFORMATION BASED ON MACHINE LEARNING

(71) Applicant: Electronics and Telecommunications Research Institute, Daejeon (KR)

(72) Inventors: Yong Jin Kwon, Daejeon (KR); Yun Joo Kim, Daejeon (KR); Hyun Seo Park, Daejeon (KR); An Seok Lee, Daejeon (KR); Yu Ro Lee, Daejeon (KR); Heesoo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 441 days.

(21) Appl. No.: 17/982,937

(22) Filed: Nov. 8, 2022

(65) Prior Publication Data

US 2023/0145844 A1    May 11, 2023

(30) Foreign Application Priority Data

Nov. 8, 2021    (KR) .................. 10-2021-0152565

(51) Int. Cl.
*H04W 72/0453* (2023.01)
*G06N 20/00* (2019.01)
*H04W 72/23* (2023.01)

(52) U.S. Cl.
CPC ........ *H04W 72/0453* (2013.01); *G06N 20/00* (2019.01); *H04W 72/23* (2023.01)

(58) Field of Classification Search
CPC ........ G06N 20/00; G06N 3/044; G06N 3/045; G06N 3/08; H04B 7/0626; H04B 7/0452; H04B 7/0658; H04W 72/0453; H04W 72/23; H04W 72/51; H04W 8/24; H04L 25/0254; H04L 25/0224
See application file for complete search history.

(56) References Cited

U.S. PATENT DOCUMENTS

| 8,831,080 B2 | 9/2014 | Gupta |
| 9,031,147 B2 | 5/2015 | Kim et al. |
| 9,515,843 B2 | 12/2016 | Diab |
| 10,911,113 B2 | 2/2021 | Wen et al. |

(Continued)

OTHER PUBLICATIONS

"Machine Learning-Based Channel Prediction in Massive MIMO With Channel Aging"; Yuan et al.; IEEE Transactions on Wireless Communications, vol. 19, No. 5, May 2020 (Year: 2020).*

(Continued)

*Primary Examiner* — Benjamin H Elliott, IV
(74) *Attorney, Agent, or Firm* — KILE PARK REED & HOUTTEMAN PLLC

(57) ABSTRACT

A method of a base station may comprise: determining one of machine learning (ML) models for receiving channel information for a channel to communicate with a terminal based on capability information of the terminal; providing configuration information of the determined ML model to the terminal; updating the determined ML model through online training with the terminal; and receiving channel information using the updated ML model from the terminal when communicating with the terminal.

18 Claims, 12 Drawing Sheets

(56) References Cited

U.S. PATENT DOCUMENTS

| | | | | |
|---|---|---|---|---|
| 2011/0007664 A1* | 1/2011 | Diab | | H04L 12/40136 370/254 |
| 2012/0155516 A1* | 6/2012 | Kim | | H04L 25/0204 375/219 |
| 2013/0083835 A1* | 4/2013 | Gupta | | H04B 7/0417 375/227 |
| 2013/0201912 A1* | 8/2013 | Sheng | | H04B 7/0626 370/328 |
| 2013/0273930 A1* | 10/2013 | Damnjanovic | | H04W 72/542 455/452.1 |
| 2016/0043748 A1* | 2/2016 | Brisebois | | H04B 1/1036 455/230 |
| 2018/0150143 A1* | 5/2018 | Orr | | G06F 40/216 |
| 2018/0227928 A1* | 8/2018 | Kim | | H04L 5/0023 |
| 2018/0367192 A1* | 12/2018 | O'Shea | | H04B 7/0452 |
| 2020/0167611 A1* | 5/2020 | Yoon | | G06N 3/08 |
| 2020/0220593 A1* | 7/2020 | Wen | | H04B 7/0626 |
| 2021/0110261 A1* | 4/2021 | Lee | | H04L 25/0254 |
| 2021/0211164 A1* | 7/2021 | O'Shea | | G06N 3/088 |
| 2021/0297178 A1* | 9/2021 | Kim | | H04L 1/0026 |
| 2021/0351959 A1* | 11/2021 | Zhang | | H04W 72/542 |
| 2022/0043703 A1* | 2/2022 | Hwang | | G06T 11/206 |
| 2022/0116178 A1* | 4/2022 | Go | | H04L 1/0013 |
| 2022/0132434 A1* | 4/2022 | Lee | | H04L 5/0048 |
| 2022/0352955 A1* | 11/2022 | Zeng | | H04B 7/0626 |
| 2023/0145844 A1* | 5/2023 | Kwon | | G06N 20/00 370/329 |
| 2023/0409963 A1* | 12/2023 | Narayanan Thangaraj | | G06N 3/084 |

OTHER PUBLICATIONS

Chao-Kai Wen et al., "Deep learning for Massive MIMO CSI Feedback", IEEE Wireless Communications Letters, Oct. 2018, vol. 7, No. 5, pp. 748-751.

"Moderator's summary for discussions [RAN93e-R18Prep-12] AI-ML", Electronic Meeting, Sep. 13-17, 2021, Variant of RAN93e-R18Prep-12 AI/ML email discussion Sep. 2021 Version 0.0.4.

RAN Rel-18 workshop summary, RWS-210659, Source: RAN Chair.

* cited by examiner

◯ Orthogonal DFT beam directions
◯ Oversampled DFT beam directions

METHOD AND APPARATUS FOR TRANSMITTING CHANNEL INFORMATION BASED ON MACHINE LEARNING

CROSS-REFERENCE TO RELATED APPLICATIONS

This application claims priority to Korean Patent Applications No. 10-2021-0152565, filed on Nov. 8, 2021 with the Korean Intellectual Property Office (KIPO), the entire contents of which are hereby incorporated by reference.

BACKGROUND

1. Technical Field

Exemplary embodiments of the present disclosure relate to a technique for channel information transfer between a base station and a terminal in a mobile communication system, and more specifically, to a machine learning-based technique for channel information transfer between a base station and a terminal in a mobile communication system using a plurality of transmit/receive antennas.

2. Related Art

Based on the rapid development of wireless communication technology, various types of communication schemes such as, for example, a mobile communication system, a satellite communication system, and a wireless local area communication system (W-RAN) have been provided. Among these schemes, the mobile communication system may be the most representative scheme, and standards are being established under names such as long-term evolution (LTE), LTE-Advanced (LTE-A), and new radio (NR).

In the wireless communication technology, a method of obtaining channel information between a base station and a terminal or between terminals is very important. If a channel state is not known between the base station and the terminal or between the terminals, that is, between a transmitter and a receiver, the receiver may not be able to normally restore signals transmitted from the transmitted. Accordingly, various methods for measuring channel information are proposed in a wireless communication system. In addition, the measured channel information should be provided to the transmitter.

SUMMARY

Exemplary embodiments of the present disclosure provide a preparation process for utilizing machine learning-based channel information compression and decompression techniques in a wireless communication system, and a method and an apparatus for efficiently transferring channel information using a determined machine learning model.

Exemplary embodiments of the present disclosure also provide a method and apparatus for transferring channel information with a low overhead in a wireless communication system using a plurality of antennas.

According to a first exemplary embodiment of the present disclosure, a method of a base station may comprise: determining one of machine learning (ML) models for receiving channel information for a channel to communicate with a terminal based on capability information of the terminal; providing configuration information of the determined ML model to the terminal; updating the determined ML model through online training with the terminal; and receiving channel information using the updated ML model from the terminal when communicating with the terminal.

The capability information of the terminal may include at least one of whether the terminal supports use of the ML model, computation capability of the terminal, a memory size of the terminal, a current moving speed of the terminal, or combinations thereof.

The configuration information of the determined ML model may be transmitted as at least one data packet.

The ML model may be a model in which a decoder of the base station and an encoder of the terminal are connected as one pair.

The ML model may be a model in which a decoder of the base station and decoders of one or more terminals including the terminal communicating with the base station are connected as a set.

The online training may comprise: transmitting an online training request for the determined ML model to the terminal; instructing the terminal to initiate the online training when receiving an online training response indicating that the online training is possible from the terminal; and updating parameters of the determined ML model to update the determined ML model.

The updating of the parameters may comprise: transmitting a reference signal to the terminal; receiving, from the terminal, channel information measured based on the reference signal; receiving compressed bits for the channel information; decoding the compressed bits to obtain channel information; updating at least one parameter of the determined ML model based on the measured channel information and the obtained channel information; and transmitting the updated parameters to the terminal.

The updating of the parameters may comprise: transmitting a reference signal to the terminal; receiving, from the terminal, channel information measured based on the reference signal; generating compressed bits based on the channel information through an encoder of the determined ML model; decoding the generated compressed bits by using a decoder of the determined ML model; updating at least one parameter of the ML model based on the decoded information and the measured channel information; and transmitting the updated parameter to the terminal.

The updating of the parameters may comprise: transmitting a reference signal to the terminal; receiving, from the terminal, compressed bits corresponding to channel information measured based on the reference signal; receiving information on updated parameters for the determined ML model from the terminal; and updating the determined ML model by using the received information of the updated parameters.

According to a second exemplary embodiment of the present disclosure, a base station may comprise: a transceiver configured to transmit and receive signals with at least one terminal by using an machine learning (ML) model; and at least one processor, wherein the at least one processor may be executed to: determine one of ML models for receiving channel information for a channel to communicate with a terminal based on capability information of the terminal; provide configuration information of the determined ML model to the terminal through the transceiver; update the determined ML model through online training with the terminal; and receive channel information using the updated ML model from the terminal when communicating with the terminal.

The capability information of the terminal may include at least one of whether the terminal supports use of the ML model, computation capability of the terminal, a memory size of the terminal, a current moving speed of the terminal, or combinations thereof.

The configuration information of the determined ML model may be transmitted as at least one data packet.

The ML model may be a model in which a decoder of the base station and an encoder of the terminal are connected as one pair.

The ML model may be a model in which a decoder of the base station and decoders of one or more terminals including the terminal communicating with the base station are connected as a set.

In the online training, the at least one processor may be further executed to: transmit an online training request for the determined ML model to the terminal through the transceiver; instruct the terminal to initiate the online training when receiving an online training response indicating that the online training is possible from the terminal; update parameters of the determined ML model to update the determined ML model.

In the updating of the parameters, the at least one processor may be further executed to: transmit a reference signal to the terminal through the transceiver; receive, from the terminal, channel information measured based on the reference signal; receive compressed bits for the channel information; decode the compressed bits to obtain channel information; update at least one parameter of the determined ML model based on the measured channel information and the obtained channel information; and transmit the updated parameters to the terminal.

In the updating of the parameters, the at least one processor may be further executed to: transmit a reference signal to the terminal through the transceiver; receive, from the terminal, channel information measured based on the reference signal; generate compressed bits based on the channel information through an encoder of the determined ML model; decode the generated compressed bits by using a decoder of the determined ML model; update at least one parameter of the determined ML model based on the decoded information and the measured channel information; and transmit the updated parameter to the terminal.

In the updating of the parameters, the at least one processor may be further executed to: transmit a reference signal to the terminal through the transceiver; receive, from the terminal, compressed bits corresponding to channel information measured based on the reference signal; receive information on updated parameters for the determined ML model from the terminal; and update the determined ML model by using the received information of the updated parameters.

According to a third exemplary embodiment of the present disclosure, a method of a terminal may comprise: configuring an machine learning (ML) model to be used for communication with a base station based on configuration information of the ML model received from the base station; updating the ML model through online training with the base station; measuring channel information during communication with the base station; generating compressed bits corresponding to the measured channel information by using the updated ML model; and transmitting the generated compressed bits to the base station.

The method may further comprise, when requested by the base station, transmitting capability information of the terminal, the capability information including at least one of whether the terminal supports use of the ML model, computation capability of the terminal, a memory size of the terminal, a current moving speed of the terminal, or combinations thereof.

According to the present disclosure, channel information can be effectively transferred using a preparation process for utilizing machine learning-based channel information compression and decompression techniques and a determined machine learning model in the wireless communication system. In addition, according to the present disclosure, provided are a method and an apparatus for transferring the channel information with low overhead in the wireless communication system using a multi-antenna.

DETAILED DESCRIPTION OF THE EMBODIMENTS

Figure 1:
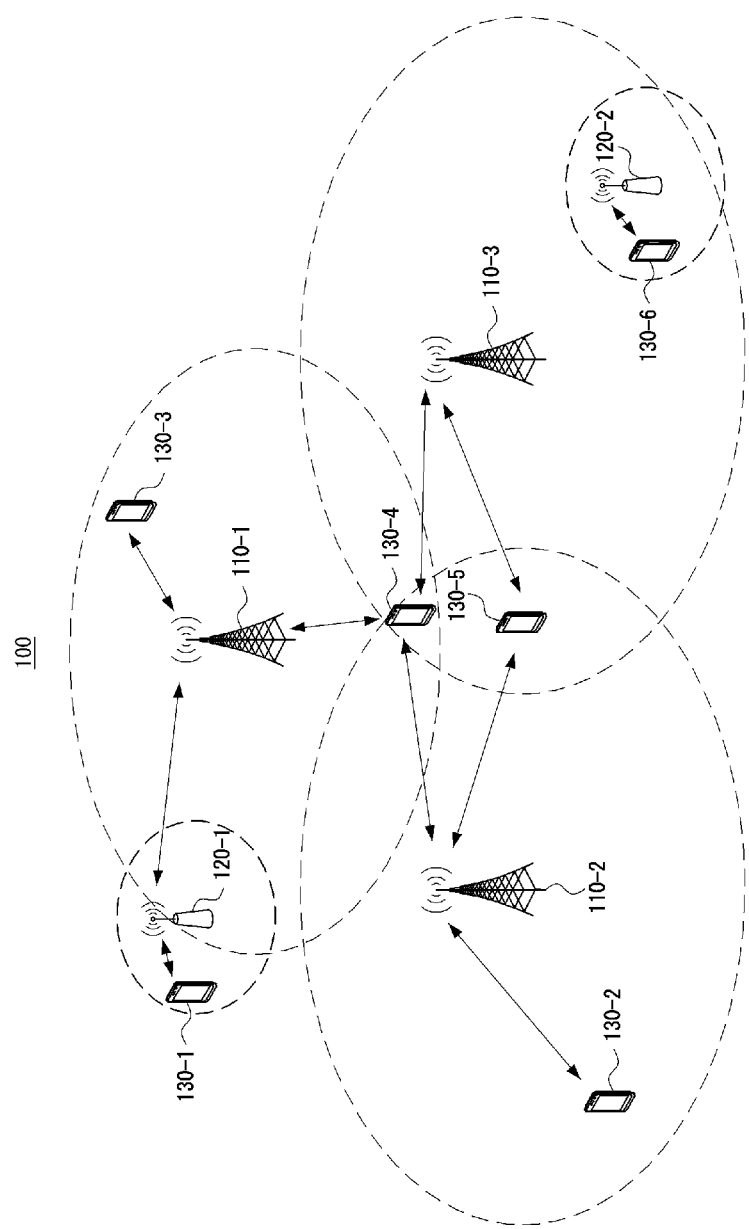
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
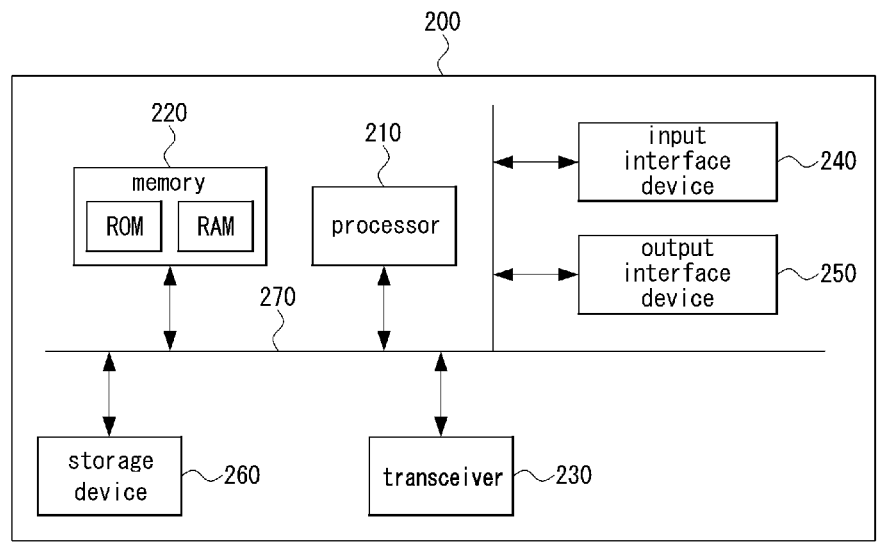
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, a method and an apparatus for machine learning (ML)-based channel information transfer in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/ reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

The present disclosure to be described below relates to methods of using ML-based channel information compression and decompression techniques to obtain channel information in a cellular communication system. In particular, a procedure of determining an ML model for channel information transfer, a procedure of performing additional online learning on the determined ML model, and a procedure of measuring a communication channel using the trained ML model and delivering the measurement result will be described.

First, a general method for measuring channel information in the mobile communication system and a method for measuring channel information currently used in the 3GPP communication system will be described below.

[Classification of Channel Information Measurement Methods]

In order to increase a transmission capacity in the mobile communication system, it is essential to identify radio channel information. In order to identify the radio channel information, a method for measuring a radio channel from a transmitter to a receiver is used. There are two main methods for measuring a radio channel.

The first method of measuring a radio channel is a method that utilizes channel reciprocity. In addition, the second method of measuring a radio channel is a method in which a receiving end, which receives a specific reference signal transmitted from a transmitting end, measures channel information, and feeds a measurement result back to the transmitting end.

Figure 3A:
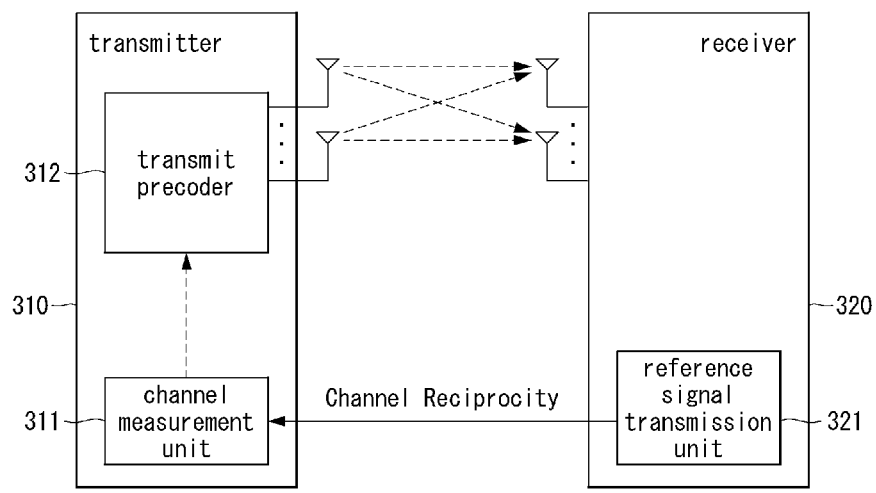
FIG. 3A is an exemplary diagram for describing a method of measuring channel information using channel reciprocity.

FIG. 3A is an exemplary diagram for describing a method of measuring channel information using channel reciprocity.

Referring to FIG. 3A, both a transmitter 310 and a receiver 320 may be communication devices using a plurality of antennas. The transmitter 310 and the receiver 320 may be the communication devices 110, 120, 130, and 200 described with reference to FIGS. 1 and 2. In terms of configuration, the configuration illustrated in FIG. 3A may exemplify only a portion of the configuration of the transceiver 230 described in FIG. 2.

The transmitter 310 may include a channel measurement unit 311 and a transmit precoder 312. A signal (or data) precoded by the transmit precoder 312 may be transmitted to the receiver 320 through a multi-antenna. The transmitter 310 may transmit a signal (or data) through each of a plurality of antennas provided, and the receiver 320 may receive the signal through each of a plurality of antennas provided. In addition, an inverse relationship, that is, signal transmission from the receiver 320 to the transmitter 310 may be performed in the same manner.

The receiver 320 may generate a reference signal to be transmitted by a reference signal transmission unit 321 and transmit it to the transmitter 310. In FIG. 3A, for convenience and understanding of description, a form in which the reference signal transmitted by the receiver 320 is transmitted to the transmitter 310 through the antenna is not illustrated, but a form in which the reference signal transmitted by the reference signal transmission unit 321 of the receiver 320 is transmitted to the channel measurement unit 311 is illustrated. However, those skilled in the art may know that the reference signal transmitted by the receiver 320 is transmitted through a plurality of antennas.

In the mobile communication system utilizing channel reciprocity as in FIG. 3A, it may be assumed that channel information required for transmission from the transmitter 310 to the receiver 320 is the same as channel information required for transmission from the receiver 320 to the transmitter 310. Accordingly, the receiver 320 may transmit a predefined specific reference signal to the transmitter 310. The transmitter 310 may receive the signal transmitted from the reference signal transmission unit 321 of the receiver 320 through multiple antennas. The channel measurement unit 311 of the transmitter 310 may estimate channel information by measuring the received reference signal. Based on the channel information estimated by the channel measurement unit 311, the transmit precoder 312 may determine a precoder required for transmission of a signal (or data) to be transmitted to the receiver 320. Accordingly, the transmitter 310 may precode the signal (or data) to be transmitted in the transmit precoder 312, and transmit it through multiple antennas.

The method of utilizing channel reciprocity assumes that a channel through which the receiver 320 transmits a signal to the transmitter 310 and a channel through which the transmitter 310 transmits a signal to the receiver 320 are the same. Therefore, it is not necessary to estimate the channel through which the transmitter 310 transmits a signal to the receiver 320.

Figure 3B:
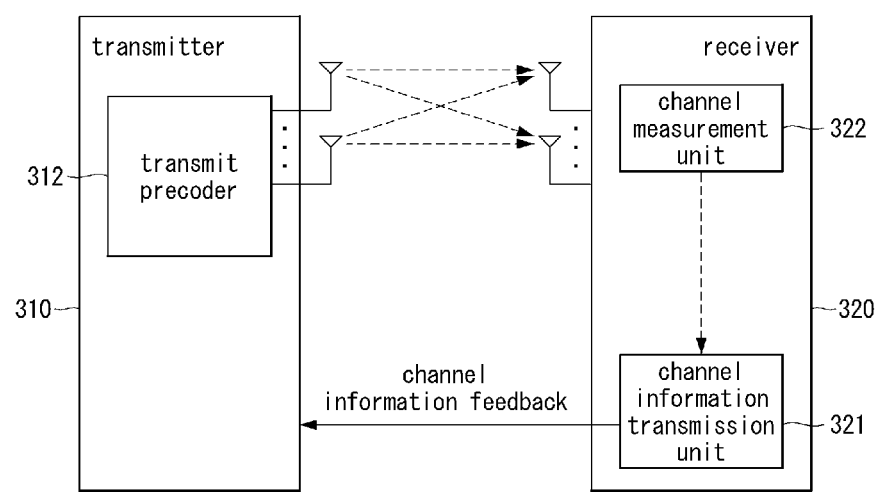
FIG. 3B is an exemplary diagram for describing a method of measuring channel information using channel feedback.

FIG. 3B is an exemplary diagram for describing a method of measuring channel information using channel feedback.

Referring to FIG. 3B, both the transmitter 310 and the receiver 320 may be communication devices using a plurality of antennas. The transmitter 310 and the receiver 320 may be the communication devices 110, 120, 130, and 200 described with reference to FIGS. 1 and 2. In terms of configuration, the configuration illustrated in FIG. 3B may exemplify only a portion of the configuration of the transceiver 230 described in FIG. 2. In addition, the configuration of FIG. 3B has some different components compared to the configuration of FIG. 3A described above. However, the communication devices 110, 120, 130, and 200 may be implemented to have only the components illustrated in FIG. 3A, only the components illustrated in FIG. 3B, or all of the components illustrated in FIGS. 3A and 3B.

Referring to FIG. 3B, the transmitter 310 includes the transmit precoder 312. The transmit precoder 312 included in the transmitter 310 may precode and output a signal to be transmitted to the receiver 320. The signal output from the transmit precoder 312 may be radiated from a multi-antenna and transmitted to the receiver 320 through a predetermined channel. In addition, as described with reference to FIG. 3A, the signal output from each of the plurality of antennas of the transmitter 310 may be received by each of the antennas of the receiver 320.

In addition, the receiver 320 may include the channel measurement unit 322 for measuring a channel of the signal transmitted from the plurality of antennas of the transmitter 310, and a channel information transmission unit 323 for feeding the channel information measured by the channel measurement unit 322 back to the transmitter 310.

Compared to the configuration of FIG. 3A, the configuration of FIG. 3B additionally requires the unit for feeding back the channel information. However, the configuration of the transmitter 310 and the receiver 320 of FIG. 3B has an advantage in that the transmitter 310 measures a channel through which data is actually transmitted to the receiver 320. According to the type of information fed back in this process, this process may be further classified into two types. Specifically, it may be classified into an explicit feedback scheme in which feedback information directly indicates the channel information and an implicit feedback scheme in which information recommended for a transmission process is delivered according to a predetermined format.

The 3GPP, the representative cellular international standardization organization, uses the implicit channel feedback scheme among the channel information transfer methods mentioned above. The channel information transferred from the receiver 320 to the transmitter 310 according to the implicit channel feedback scheme may be referred to as 'channel state information (CSI)'. The CSI may be transferred through a CSI report. The CSI report may include the following information.

1) Channel Quality Information (CQI): CQI indicates a modulation scheme and a code rate that can satisfy a block error probability (BLER) above a certain level.

2) Rank Indicator (RI): RI indicates the number of MIMO layers that can be transmitted simultaneously.

3) Precoding Matrix Indicator (PMI): PMI is used when the transmitter 310 uses a transmit (Tx) precoding technique. In this case, the receiver 320 may determine one codebook for recommending a preferred precoding matrix from among predetermined codebook-based matrices based on the measured channel. The PMI may be used to indicate the determined codebook.

Then, a method of transferring PMI information for the transmit precoding will be described in more detail. As described above, the codebook-based scheme does not transfer measured channel information as it is. That is, the precoding scheme is a scheme in which precoding matrices having predetermined patterns are preconfigured, and information indicating a specific precoding matrix is transmitted, which the receiver desires to use among the corresponding precoding matrices.

Figure 4A:
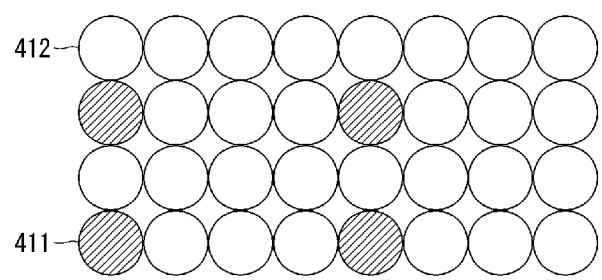
FIG. 4A is an exemplary diagram illustrating beams generated based on one precoding matrix.
Figure 4B:
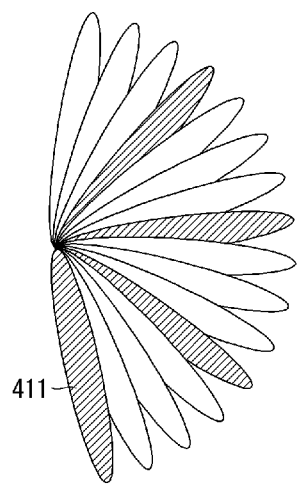
FIG. 4B is an exemplary diagram illustrating transmit directions based on one precoding matrix.

FIG. 4A is an exemplary diagram illustrating beams generated based on one precoding matrix, and FIG. 4B is an exemplary diagram illustrating transmit directions based on one precoding matrix.

Referring to FIG. 4A, each of circles illustrated in FIG. 4A may correspond to one beam, illustrating a two-dimensional arrangement in which 8 beams are arranged in a horizontal direction and 4 beams are arranged in a vertical direction. In addition, each beam may have an orthogonal discrete Fourier transform (DFT) beam direction 411 or an oversampled DFT beam direction 412. Among the beams illustrated in FIG. 4A, four beams form a set of orthogonal beams. That is, four of the beams illustrated in FIG. 4 may correspond to orthogonal DFT beam directions. The shape of the beams illustrated in FIG. 4A may be predetermined by a precoding matrix. The shape of these beams may be generated according to an antenna configuration.

The transmit directions of the beams generated based on the precoding matrix illustrated in FIG. 4A may be as illustrated in FIG. 4B. That is, four different orthogonal DFT beams may be co-located with the oversampled DFT beams.

The transmitter that forms beams as illustrated in FIGS. 4A and 4B based on a predetermined precoding matrix may transmit a signal to the receiver through the corresponding beams. For example, the signal may be transmitted from a base station (e.g., transmitter) to a terminal (e.g., receiver) using the beams illustrated in FIGS. 4A and 4B.

The receiver (e.g., terminal) may receive the beams generated based on the predetermined precoding matrix as shown in FIGS. 4A and 4B. In addition, the receiver may select a precoding matrix that is considered appropriate according to the measured channel environment from among the plurality of beams. The selected precoding matrix may be transmitted to the transmitter (e.g., base station) using a PMI as described above.

Meanwhile, a PMI structure used in the 3GPP is largely classified into a Type I scheme and a Type II scheme. The Type I scheme is a scheme of transferring information on one specific beam, whereas the Type II scheme is a scheme of transferring information on a linear combination of multiple beams.

Figure 5A:
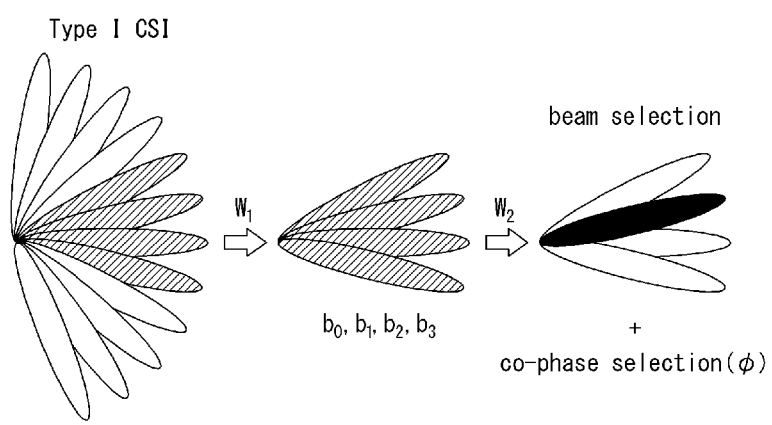
FIG. 5A is an exemplary diagram for describing channel state information based on the Type I scheme in the 3GPP PMI structure.
Figure 5B:
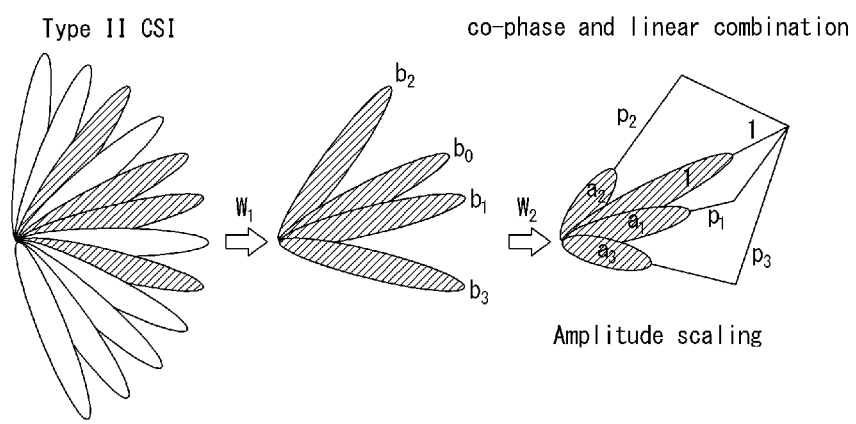
FIG. 5B is an exemplary diagram for describing channel state information based on the Type II scheme in the 3GPP PMI structure.

FIG. 5A is an exemplary diagram for describing channel state information based on the Type I scheme in the 3GPP PMI structure, and FIG. 5B is an exemplary diagram for describing channel state information based on the Type II scheme in the 3GPP PMI structure.

The Type I scheme illustrated in FIG. 5A may be a scheme using predefined precoding matrixes selected by a radio resource control (RRC) configuration. Referring to FIG. 5A, the precoder of the transmitter (e.g., base station) may transmit beams $b_0$, $b_1$, $b_2$, and $b_3$ selected from a specific precoding matrix among a plurality of beams to the receiver. Then, the receiver (e.g., terminal) may select one beam among the received beams. FIG. 5A exemplifies this procedure.

Specifically, referring again to FIG. 5A, the precoder may first select specific beams $b_0$, $b_1$, $b_2$, and $b_3$ based on a first precoder matrix $W_1$ indicating a long term frequency-independent characteristic of the channel, and then apply a second precoder matrix $W_2$ representing a short term frequency-dependent characteristic of the channel. Accordingly, the precoder of the transmitter may transmit a signal to which the first precoder matrix $W_1$ and the second precoder matrix $W_2$ are applied to the receiver through a plurality of beams. Then, the receiver may select the most suitable one beam among these beams. In this case, when the receiver selects one beam, co-phase selection may be performed together as illustrated in FIG. 5A.

Then, the Type II scheme will be described with reference to FIG. 5B. The Type II scheme illustrated in FIG. 5B is basically designed for multi-user multi-input multi-output (MIMO). The codebook-based CSI feedback of the Type II scheme is defined to include and report wideband and subband amplitude information of a selected beam. Therefore, the Type II scheme may also select specific beams $b_0$, $b_1$, $b_2$, and $b_3$ based on the first precoder matrix $W_1$ indicating the long term frequency-independent characteristic of the channel, and then apply the second precoder matrix $W_2$ indicating the short term frequency-dependent characteristic of the channel, similarly to the Type I scheme. In the Type II scheme, amplitude scaling information may be additionally included.

Therefore, the Type II scheme has an advantage in multi-user MIMO transmission because it can represent a more diverse channel environment than the Type I scheme. On the other hand, the Type II scheme has a disadvantage in that communication overhead increases because the amount of information to be transmitted increases compared to the Type I scheme.

Meanwhile, the 3GPP intends to discuss technology to improve the wireless environment by using ML technology in the future release 18 (Rel-18) (e.g., RWS-210659, "Summary of RAN Rel-18 Workshop", RAN Chair). In addition, in the case of the 3GGP communication system-based channel measurement information transfer methods described above, as the Type II codebook scheme is applied, an overhead gradually increases to express the communication channel in more detail. In order to overcome this, a scheme in which the receiver compresses and transmits direct channel information or related channel information using ML technology, and the transmitter receives and decompresses compressed bits (or compressed information) is being discussed in the 3GPP. That is, a method of reducing the overhead of the channel information feedback and improving the performance in the above described manner is being discussed as the main technology of the RAN1 workshop and a study item of the 3GPP Rel-18 (RP-211662, "Moderator's summary for discussion [RAN93e-R18Prep-12] AI/ML").

The present disclosure is directed to proposing a method for channel information feedback by using ML techniques discussed in the 3GPP. Hereinafter, a channel information feedback method using ML techniques will be described.

Figure 6:
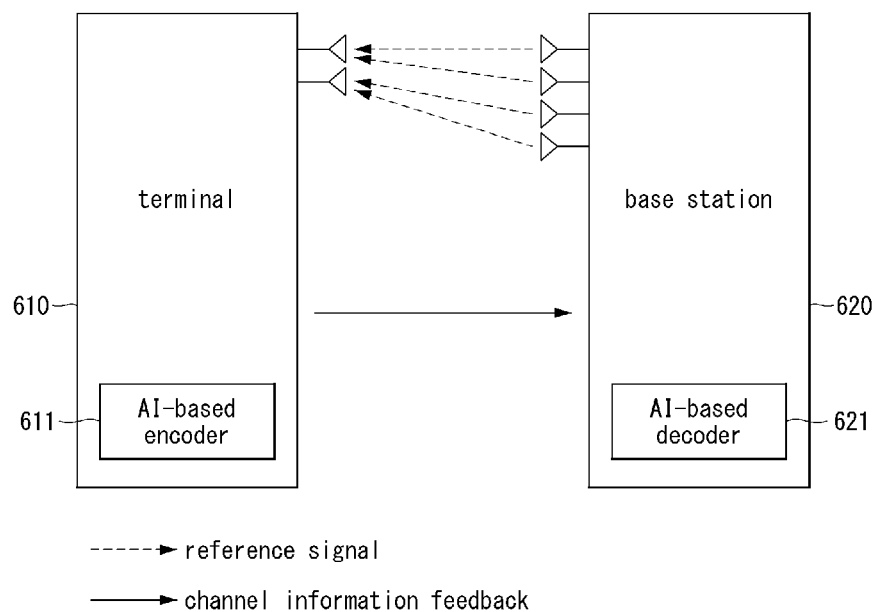
FIG. 6 is an exemplary diagram for describing a channel information transfer method based on machine learning.

FIG. 6 is an exemplary diagram for describing a channel information transfer method based on machine learning.

Referring to FIG. 6, a base station 620 having a multi-antenna may include an artificial intelligence (AI)-based decoder 621. A terminal 610 having a multi-antenna may include an AI-based encoder 611.

In general, the number of antenna elements constituting the multi-antenna of the base station 620 is greater than the number of antenna elements constituting the multi-antenna of the terminal 610. FIG. 6 illustrates a case in which the number of antennas of the base station 620 is greater than that of the terminal 610. It should be noted that only two antennas of the terminal 610 are illustrated in FIG. 6 to explain a plurality of antenna elements due to a limitation of the drawing, and it should be noted that the antennas of the terminal 610 are not limited to two antennas. Also, it should be noted that the example of four antenna elements of the base station 620 in FIG. 6 is only an example of a form including a plurality of antenna elements due to the limitation of the drawing, and the antennas of the base station 620 are not limited to four antennas.

Referring to FIG. 6, the base station 620 may transmit a reference signal to the terminal 610 using a plurality of antennas. In this case, the transmitted reference signal may be determined and transmitted in the same manner as described above. However, in the present disclosure, there is only a difference in that it is for determining a precoding scheme based on AI.

The terminal 610 may measure the reference signal transmitted by the base station 620. In addition, the terminal 610 may obtain compressed bits using the AI-based encoder 611 trained in advance through machine learning in order to transmit channel information obtained by measuring the reference signal. Here, as described above, the compressed bits may be information for the Type II codebook scheme or may be a compressed form of the channel matrix itself. The terminal 610 may feedback the compressed bits to the base station 620 using a preconfigured channel.

The base station 620 may receive the compressed bits fed back from the terminal 610. The compressed bits may be the channel information, and may be the information for the Type II codebook scheme or the compressed form of the channel matrix itself. In addition, the base station 620 may include the AI-based decoder 621 trained through machine learning. The AI-based decoder 611 may obtain the channel information by decompressing the compressed information from the received compressed bits.

In general, the AI-based encoder 611 and the AI-based decoder 621 have an autoencoder structure in the process of training the machine learning model. In addition, the basic structure of the channel information fed back using machine learning may be the same as the channel information structure of the 3GPP. As another example, the basic structure of channel information fed back by using machine learning may be a partially modified form of the channel information structure of the 3GPP. As another example, the basic structure of channel information fed back using machine learning may have a new structure not defined in the 3GPP.

The AI-based encoder 611 included in the terminal 610 described above may compress and transfer measured channel information using a specific ML model, and the AI-based decoder 621 included in the base station 620 may obtain the channel information by decompressing the information compressed and transferred using the specific ML model.

To this end, in the channel measurement process, the base station 620 and the terminal 610 may need to go through a process of determining the ML model to be used. The encoder 611 used by the terminal 610 and the decoder 621 used by the base station 620 may be connected in the autoencoder structure described above, that is, the encoder and the decoder may be connected in the process of training the ML model. In the case of using such the autoencoder structure, the terminal 610 and the base station 620 may not operate using separate ML models. That is, the encoder 611 used by the terminal 610 and the decoder 621 used by the base station 620 may need to use the same ML model. If the terminal 610 and/or the base station 620 can use one of two or more ML models, the terminal 610 and the base station 620 may need to perform a process of determining the ML model to be used with each other.

Figure 7:
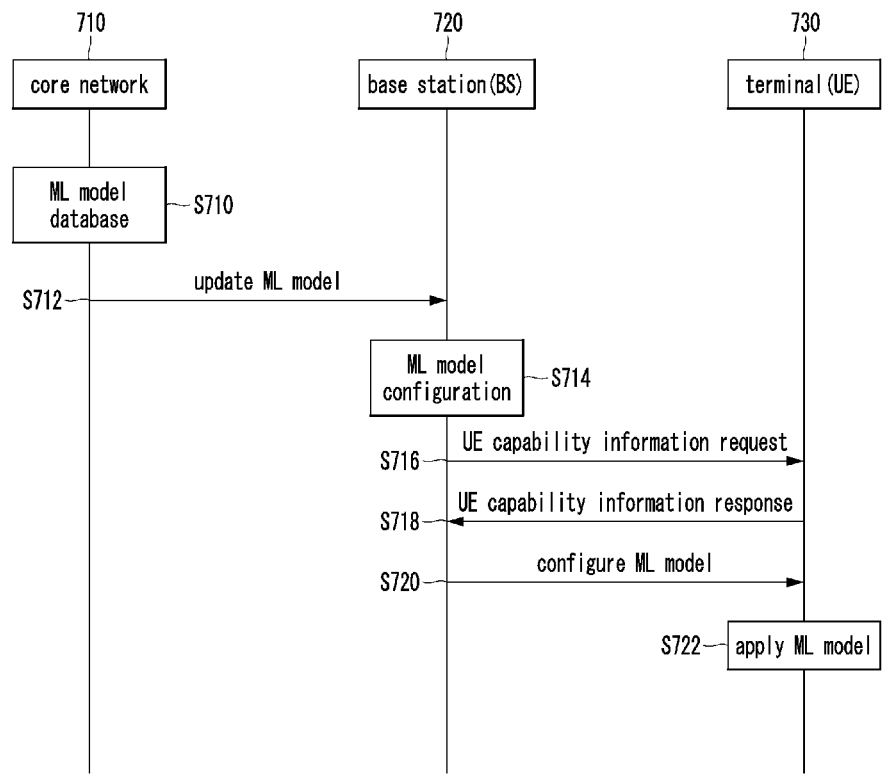
FIG. 7 is a signal flow diagram for determining an ML model according to the present disclosure.

FIG. 7 is a signal flow diagram for determining an ML model according to the present disclosure.

A specific network entity of a core network 710 may have various types of ML models stored in a database form (S710). In the following description, the specific network entity will be referred to as the core network 710 for convenience of description.

The various ML models stored in the core network 710 may include, for example, a deep neural network (DNN), a convolutional neural network (CNN), a recurrent neural network (RNN), a transformer, and the like. The ML models exemplified here are merely examples and are not limited thereto. The core network 710 may store at least one of the ML models exemplified above or a new ML model in addition to the ML models exemplified above. However, in the diagram of FIG. 7, it is assumed that at least one of the above ML models is used for convenience of description.

The ML models stored in the core network 710 may be ML models in which configuration of parameters is completed through offline learning in advance for channel information transfer from the terminal 730 to the base station 720. In addition, as a dataset used in the offline learning process, channel data measured in an actual field or channel data generated in a diverse environment through simulation may be used.

The core network 710 may transmit information for updating the ML model to the base station 720 (S712). The transmission of the information for updating the ML model in step S712 may be performed when a specific ML model stored in the database of the core network 710 is updated, when a base station is newly installed or reset, or when a new ML model is stored. If a specific base station uses only one specific ML model, the core network 710 may perform step S712 only when there is a change in the ML model used by the corresponding base station.

The base station 720 may configure the ML model or update the parameters of the ML model based on the ML model update information received from the core network 710 in step S712 (S714). The configuration of the ML model may include a case where the ML model is updated as a new model or parameters of the ML model are updated. When the ML model is configured and the decoder and the encoder have an autoencoder structure between the base station 720 and the terminal 730, the base station 720 may need to provide the updated parameters of the ML model to the terminal 730.

The base station 720 may request UE capability information from the terminal 730 (S716). This may be to identify information on the ML model of the terminal 730 according to the updated ML model configuration and/or to identify whether a newly configured ML model can be applied.

Meanwhile, when the base station 720 stores the UE capability information of the terminal 730 in advance, step S716 may be omitted. The case where the base station 730 stores UE capability information may be the following cases. For example, there may be a case in which the base station 720 previously requests the UE capability information from the terminal 730 and receives and stores the UE capability information from the terminal 730. As another example, it may be a case where the terminal 730 is a terminal handed over from another base station, and the UE capability information of the terminal 730 is provided from another base station and/or the core network 710.

As another example, although the base station 720 does not store the ULE capability information of the terminal, there may be a case where step S716 is omitted. For example, when the UE capability information of the terminal 730 can be obtained from a specific network function (NF) of the core network 710, step S716 may be omitted.

The terminal 730 may transmit UE capability information to the base station 720 in response to the UE capability information request (S718). If the UE capability information request is omitted as described in step S716, step S718 may also be omitted.

When the base station 720 receives the UE capability information in step S718, the base station 720 may store the received UE capability information. In addition, the base station 720 may determine the ML model to be used in the channel information transfer process based on the received UE capability information or previously stored UE capability information.

When the base station determines the ML model based on the capability of the terminal, not all of the UE capability information may be required. That is, elements of the capability information of the terminal that may be considered when determining the ML model according to the present disclosure may be summarized as exemplified in Table 1 below.

TABLE 1

| Name | Description |
| --- | --- |
| AI/ML enabled | Indication of supporting AI/ML-based operations e.g., Support/Non-support |
| Computation level | Indication of UE's computation capability e.g., High/Middle/Low |
| Memory size | Indication of UE's memory capability e.g., Large/Medium/Small |
| Mobility | Indication of UE's current velocity e.g., Fast/Moderate/Slow/Don't know |

Referring to Table 1, when the base station determines the ML model, the terminal may not support ML-based operations, and thus information indicating whether the terminal supports ML-based operations may be required. A terminal that does not support ML-based operations may not use the channel information compression and decompression functions described in the present disclosure.

A computation level of the terminal exemplified as the second element in Table 1 may be an index for indicating the computation capability of the terminal, and may be referred to when determining the complexity of the ML model to be used by the base station. In addition, the memory size of the terminal exemplified as the third element in Table 1 may be referred to when determining the complexity of the ML model to be used. Finally, the mobility of the terminal may vary from moment to moment or may be maintained for a certain period of time. The information on such the mobility of the terminal may be information necessary for a preset period unit.

In consideration of the above information, the base station 720 may determine the ML model to be used for communication with the terminal 730. That is, the base station 720 may determine the ML model for channel state information transfer.

The base station 720 may transmit configuration information of the determined ML model to the terminal 730 (S720). In this case, since a data size of the ML model may be different depending on a type of the ML model, the configuration information of the ML model may be transmitted in form of data packet(s).

In step S720, the terminal 730 may receive the configuration information of the ML model from the base station 720, and apply the ML model based on the received configuration information (S722).

Meanwhile, even if the same channel information compression operation is performed, a different ML model may be used for each terminal (i.e., UE-specific model). For example, a specific terminal may use a simpler ML model due to a limitation in the amount of computation or storage space of the terminal.

This will be further described with reference to FIG. 6.

As described above, a pair of the decoder 621 and the encoder 611 may need to have a connected model. Also, a different ML model may be used for each terminal.

It may be assumed that an encoder of a first terminal uses a first ML model and an encoder of a second terminal uses a second ML model. Even in this case, the base station should communicate with the first terminal and the second terminal. Therefore, the base station should include a first decoder corresponding to the first ML model used by the encoder of the first terminal. In addition, the base station should include a second decoder corresponding to the second ML model used by the encoder of the second terminal. That is, the base station may have to simultaneously operate a plurality of ML models. Accordingly, the base station may include a plurality of decoders respectively corresponding to the plurality of ML models.

As another example of changing the type of ML model depending on the terminal, ML model(s) with the same or similar structure may be used between the terminal and the base station, but the number of compressed bits finally generated in the terminal, that is, the amount of feedback may be changed.

As an example of changing the amount of feedback, a change in quantization of a specific ML model may be considered. This will be described with reference to FIG. 6. For example, it is assumed that the number of encoded bits output from the encoder 611 of the terminal is X bits. A case in which a quantization rate is set to a for X bits output from the encoder 611 and a case in which the quantization rate is set to b different from a may be considered. When the quantization rate is set to a, the number of compressed bits that the terminal 610 actually transfers to the base station 620 may be X/a bits. In addition, when the quantization rate is set to b, the number of compressed bits that the terminal 610 actually transfers to the base station 620 may be X/b bits.

Even when the same ML model is used as described above, if the quantization rate is changed, the number of compressed bits actually transmitted from the terminal 610 to the base station 620 may vary. The quantization rate may be shared or configured between the terminal 610 and the base station 620 by presetting the quantization rate as a predefined quantization level. Accordingly, the decoder 621 included in the base station 620 may decompress the compressed bits received from the terminal 610 based on the quantization rate and/or the quantization level.

Meanwhile, the case in which a different quantization is applied to each different terminal by using a different quantization rate has been described. That is, the case in which different quantization levels are applied to the first terminal and the second terminal has been described.

Hereinafter, a case in which two or more different quantization levels can be applied to one terminal will be described. That is, the single terminal may perform quantization by changing the quantization level according to a situation. For example, the quantization level may be changed according to the mobility characteristic of the terminal. Since a speed of change in channel information increases when the mobile terminal moves faster, it may be necessary to transmit more accurate channel information. Therefore, a terminal with a fast moving speed may lower the quantization level to transfer more compressed bits. Conversely, a terminal with a slow moving speed may transmit a small amount of compressed bits by increasing the quantization level because there is generally no change in channel information or a slow change in channel information. That is, the quantization compression rate may be changed according to a change in the current moving speed of the terminal.

In addition to the exemplary embodiment based on the moving speed for the terminal, the quantization level may be changed and applied in various other cases. For example, the quantization level may be changed in consideration of a battery state of the terminal, a distance between the terminal and the base station, and/or the like.

Meanwhile, in the above, a correspondence between one terminal and one base station, that is, one-to-one correspondence between a terminal and a base station has been described. However, in general, a plurality of terminals exist within a coverage of the base station. Therefore, one base station and a plurality of terminals may be considered.

Figure 8:
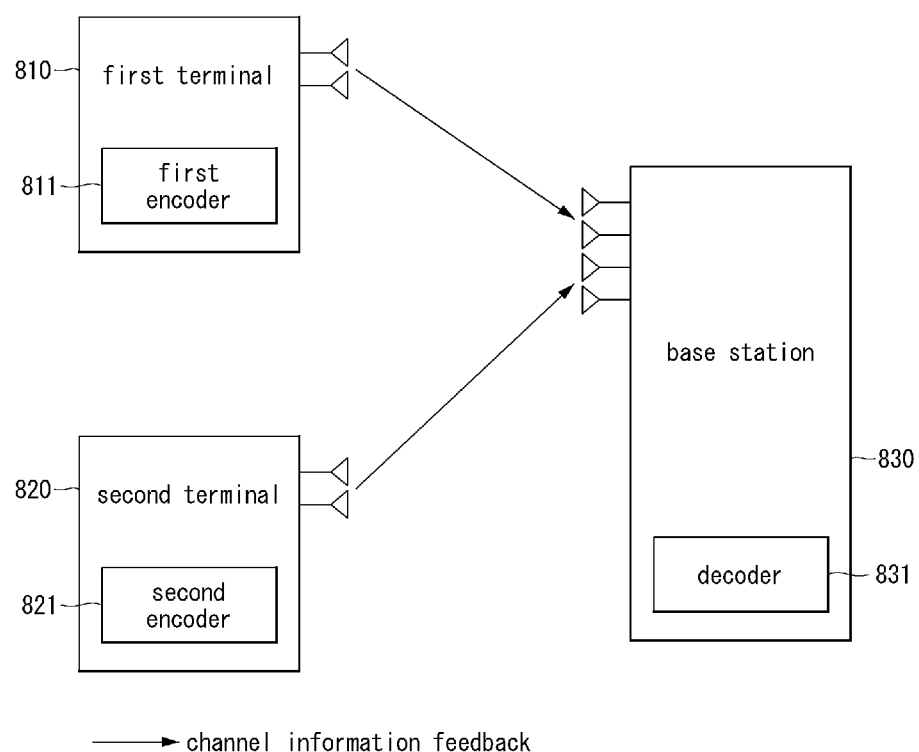
FIG. 8 is an exemplary diagram for describing an operation method of an encoder and a decoder with respect to one base station and a plurality of terminals according to an exemplary embodiment of the present disclosure.

FIG. 8 is an exemplary diagram for describing an operation method of an encoder and a decoder with respect to one base station and a plurality of terminals according to an exemplary embodiment of the present disclosure.

Referring to FIG. 8, a first terminal 810, a second terminal 820, and a base station 830 are illustrated. The first terminal 810 and the second terminal 820 may be the terminals described above with reference to FIG. 6. Accordingly, a first encoder 811 provided in the first terminal 810 may be an AI-based encoder, and a second encoder 821 provided in the second terminal 820 may also be an AI-based encoder. In addition, a decoder 831 provided in the base station 830 may be an AI-based decoder as described above with reference to FIG. 6.

The first terminal 810 and the second terminal 820 illustrated in FIG. 8 may be both located within a coverage of the base station 830 and may be terminals communicating with the base station 830. In FIG. 8, only two terminals are illustrated as an example due to a limitation of the drawing, and it should be noted that the number of terminals communicating within the base station 830 is not limited to two.

Hereinafter, an operation method when the base station 830 obtains channel information while communicating with the plurality of terminals 810 and 820 will be described with reference to FIG. 8. In the above-described example, it has been described that the base station may have a different encoder-decoder pair for each terminal (i.e., UE-specific).

Specifically, when the first encoder 811 of the first terminal 810 uses a first ML model, the second encoder 821 of the second terminal 820 may use a second ML model different from the first ML model. Accordingly, the base station 830 should include a first decoder corresponding to the first ML model used by the first encoder 811 of the first terminal 810. In addition, the base station 830 should include a second decoder corresponding to the second ML model used by the second encoder 821 of the second terminal 820. Accordingly, when an encoder-decoder pair is different for each terminal (i.e., UE-specific), the decoder 831 of the base station 830 may include a first decoder corresponding to the first encoder 811 and a second decoder corresponding to the second encoder 821.

On the other hand, in some cases, the plurality of terminals 810 and 820 may use the same encoder with respect to one decoder 831 used by the base station. That is, a base station-based (i.e., cell-specific) operation method may be possible. As described above, a case in which the same encoder is used by the terminals 810 and 820 with respect to one decoder 831 used by the base station will be further described.

The first encoder 811 of the first terminal 810 and the second encoder 821 of the second terminal 820 illustrated in FIG. 8 may have the same structure. In addition, both the first encoder 811 and the second encoder 821 may be trained as a pair with one decoder 831 in the training step. That is, the training may be performed in a structure of a set including one decoder 831 for the plurality of encoders 811 and 821. When a structure of a set in which the plurality of encoders 811 and 821 are mapped to one decoder 831 as shown in FIG. 8 is provided, there is an advantage in that the number of decoders to be operated by the base station is reduced.

In the above, the determination and update of the pre-trained ML model to be used by the terminal and the base station in the channel measurement process has been described. Such the determination and update of the ML model is to determine parameters for the ML, model in an offline state.

However, the base station and the terminal may actually perform communication in various situations. That is, the ML, model configured in the base station and the terminal may additionally require online learning to reflect various situations in addition to results in the offline state.

For example, the base station and the terminal may actually require detailed calibration according to transmit and receive antennas and RF paths. Alternatively, there is a possibility that a dataset used in the offline learning process did not completely reflect a current channel condition in which the base station and the terminal are operating. Therefore, if the already-trained channel estimation model is used without change, the channel measurement performance may decrease. To prevent this, an online learning process may be additionally performed.

Figure 9:
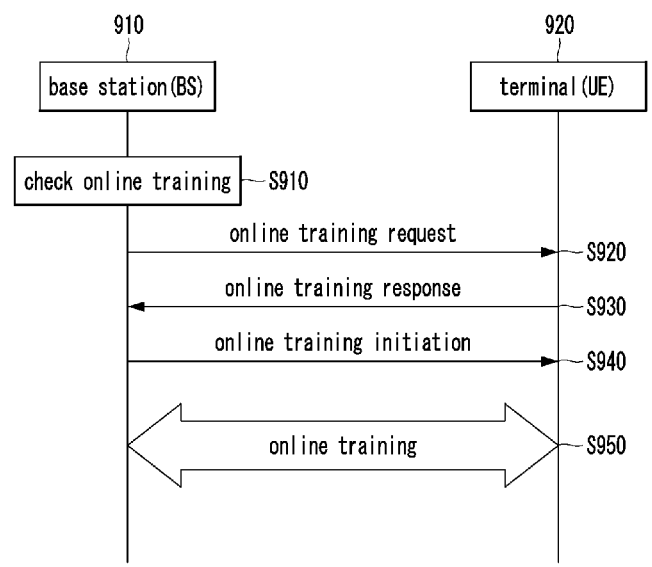
FIG. 9 is a signal flow diagram according to an additional online learning procedure of machine learning according to an exemplary embodiment of the present disclosure.

FIG. 9 is a signal flow diagram according to an additional online learning procedure of machine learning according to an exemplary embodiment of the present disclosure.

Referring to FIG. 9, a base station 910 and a terminal 920 may have an encoder and a decoder, respectively, based on the ML, model as described above. Hereinafter, a case in which the base station 910 and the terminal 920 are equipped with the decoder and the encoder as described with reference to FIGS. 6 and/or 8 will be described below.

The base station 910 may check whether online training is required for the ML model (S910). There may be various methods of checking whether online training is required. For example, it may be assumed that online training is required when an efficiency is lowered to a preset value or less in communicating with the terminal 920 using the parameters of the ML model currently stored and used in the base station 910. As another example, a case in which the ML model currently stored and used in the base station 910 is not updated for more than a preset time may be assumed as the case in which online training is required. In addition, there may be various cases where online training is required. In FIG. 9, it is assumed that online training is determined to be required.

When it is determined that online training is required as a result of the checking in step S910, the base station 910 may transmit an online training request to the terminal 920 (S920). The online training request may include information such as a request for information on the ML model and a request for performing online training. If the base station 910 already has information on the ML model of the terminal 920, the online training request may include only the request for performing online training.

Upon receiving the online training request in step S920, the terminal 920 may identify whether online training can be performed and transmit a response on whether online training is possible to the base station 910 (S930). The response may indicate whether the online training can be performed or not. In identifying whether online training can be performed, the terminal 920 may determine whether online training can be performed in consideration of whether there is data to be transmitted and/or a battery state of the terminal. Other factors may also be considered.

When receiving the online training response from the terminal 920 in step S930, the base station 910 may determine whether the terminal 920 is capable of online training. In the exemplary embodiment of FIG. 9, it is assumed that the online training response indicates that online training can be performed.

Since the base station 910 receives the response indicating that the terminal 920 is in a state where online training is possible, the base station may indicate online training initiation for the ML model (S940). In this case, when there is one ML model to be trained online, and both the terminal 920 and the base station 910 can use two or more ML models, the base station 910 may transmit information indicating the ML model to be trained online. In addition, even when there is one ML model to be trained, and both the terminal 920 and the base station 910 can use two or more ML models, if the online training request is transmitted including information on the ML model to be trained online, the online training initiation information in step S940 may not include information on the ML model to be trained online.

The base station 910 and the terminal 920 may perform online training on the ML model (S950).

In the above description, the exemplary embodiment including the procedure in which the base station 910 transmits the online training request to the terminal 920 (S920) and receives the online training response from the terminal 910 (S930) has been described. However, if the base station 910 knows in advance whether or not online training of the terminal is possible, the base station 910 may directly perform step S940 without performing the procedures of steps S920 and S930.

More specifically, the base station 910 may check whether online training for the ML model is required in step S910. Since the base station 910 knows in advance that the terminal 920 can perform online training for the ML model, the base station 910 may directly indicate the online training initiation in step S940. In this case, the online training initiation indication may include information on the ML model to be trained online. That is, as described above, when both the terminal 920 and the base station 910 can use two or more ML models, information indicating the ML model to be trained online may be included.

Thereafter, the base station 910 may perform online training for the ML model with the terminal 920 (S950).

Figure 10:
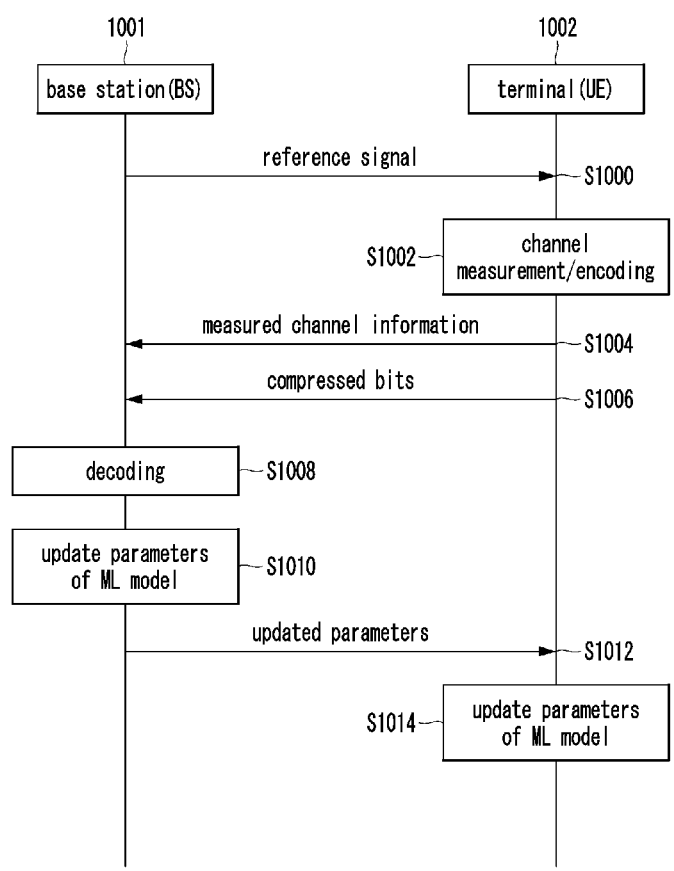
FIG. 10 is a signal flow diagram when updating parameters of an ML model according to an exemplary embodiment of the present disclosure.

FIG. 10 is a signal flow diagram when updating parameters of an ML model according to an exemplary embodiment of the present disclosure.

FIG. 10 illustrates a detailed procedure corresponding to step S950 of FIG. 9 described above. Before describing the parameter update procedure of the ML model according to the present disclosure, differences in the online training process of the ML model will be first described. The differences may occur depending on whether the ML model uses an unsupervised learning scheme or a supervised learning scheme in the online training process. In the case of supervised learning, estimated channel information having been used as an input to the encoder of the terminal may be additionally required to measure a difference from a target.

Referring to FIG. 10, a base station 1001 and a terminal 1002 may respectively include a decoder and an encoder based on the ML model described above, and may be in a state where the online training initiation of step S940 of FIG. 9 has been indicated.

The base station 1001 may transmit a reference signal to the terminal 1002 (S1000). In this case, the reference signal used may be a dedicated reference signal for parameter update of the ML model, or various types of reference signals used in the mobile communication system (e.g., 3GPP system) may be used. As a specific example, a reference signal included in a synchronization signal block (SSB), a cell-specific reference signal (CRS), or a CSI-RS may be used. In addition, various other reference signals may be used.

The terminal 1002 receiving the reference signal in step S1000 may measure a channel using the received reference signal to obtain channel information (S1002). Also, in step S1002, the terminal 1002 may obtain information corresponding to a PMI to be used based on the channel information by using the encoder using the current ML model. Accordingly, the terminal 1002 may generate compressed bits by encoding the obtained information corresponding to the PMI. Here, the information corresponding to the PMI may mean the channel state information of Type-II described with reference to FIG. 5B described above. The terminal 1002 may transmit the measured channel information to the base station 1001 (S1004), and thereafter, the terminal 1002 may transmit the compressed bits to the base station 1001 (S1006).

Here, step S1004 may be omitted depending on the online training (learning) scheme. For example, if the used ML model uses an unsupervised learning scheme, the measured channel information may not be required. On the other hand, if the used ML model uses a supervised learning scheme, the measured channel information may be required. Therefore, when the ML model uses a supervised learning scheme, since the measured channel information is required, the terminal 1002 may need to perform step S1004. On the other hand, when the ML model uses an unsupervised learning scheme, since the measured channel information is not required, the terminal 1002 may be configured not to perform step S1004.

When the ML model uses a supervised learning scheme, the base station 1001 may receive the measured channel information and the compressed bits through steps S1004 and S1006. On the other hand, when the ML model uses an unsupervised learning scheme, the base station 1001 may receive the compressed bits through step S1006 without step S1004.

The base station 1001 may decode and decompress the compressed bits (S1008). In addition, the base station 1001 may calculate gradients using the restored information, and update parameters of the ML model (S1010). After updating the parameters of the ML model, the base station 1001 may transmit information on gradients to be updated in the encoder of the terminal 1002 (S1012).

The terminal 1002 that has received the parameters updated in step S1012 may update the parameters of the ML model (S1014).

The operation of transmitting the gradients and updating the ML model in steps S1012 and S1014 may occur in each channel measurement process or may be performed by transferring accumulated gradients every predetermined number of times. The transfer of the accumulated gradients every predetermined number of times may be implemented in a form of performing step S1012 when steps S1000 to S1010 have been performed a predetermined number of times.

Figure 11:
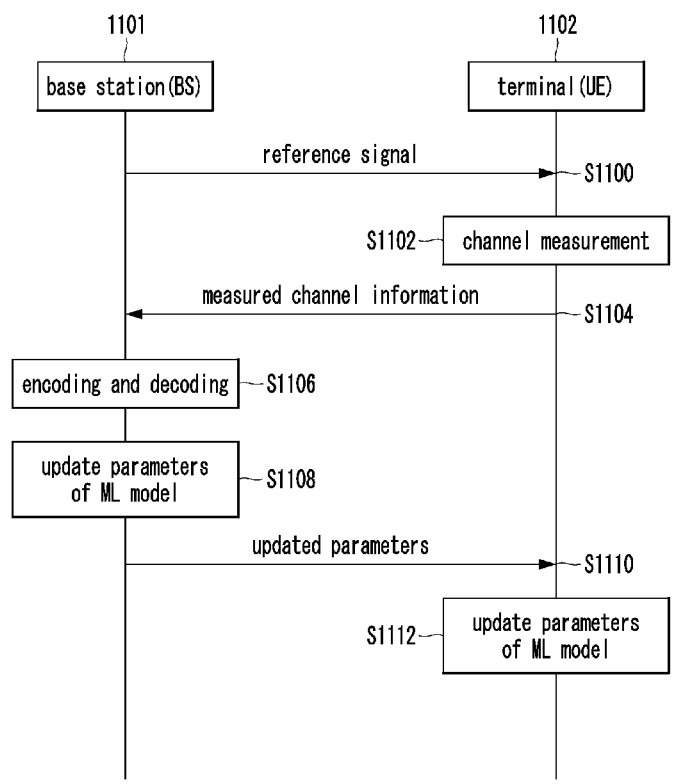
FIG. 11 is a signal flow diagram when updating parameters of an ML model according to another exemplary embodiment of the present disclosure.

FIG. 11 is a signal flow diagram when updating parameters of an ML model according to another exemplary embodiment of the present disclosure.

FIG. 11 illustrates a detailed procedure corresponding to step S950 of FIG. 9 described above. Referring to FIG. 11, a base station 1101 and a terminal 1102 may respectively include a decoder and an encoder based on the ML model described above, and may be in a state where the online training initiation of step S940 of FIG. 9 has been indicated.

The base station 1101 may transmit a reference signal to the terminal 1102 (S1100). In this case, the reference signal may be a dedicated reference signal for parameter update of the ML model, or various types of reference signals used in the mobile communication system may be used. For example, a reference signal included in an SSB or a CRS may be used. In addition, various other reference signals may be used.

The terminal 1102 receiving the reference signal in step S1100 may measure a channel using the received reference signal (S1102). The terminal 1102 may transmit the measured channel information to the base station 1101 (S1104).

Here, as described above with reference to FIG. 10, when the ML model uses an unsupervised learning scheme, since channel information is not required, the terminal 1102 may be configured not to perform step S1104. In the description of FIG. 11, it is assumed that the ML model uses a supervised learning scheme.

The base station 1101 may receive the channel information measured by the terminal 1102 (S1104). In FIG. 11, the terminal 1102 does not transmit compressed bits to the base station 1101. Accordingly, the base station 1101 may generate compressed information corresponding to a PMI based on the channel information of the terminal 1102 (S1106). That is, this may correspond to a case where the base station 1101 performs an encoding operation instead of the terminal 1102. Although the above-described drawings do not illustrate a form in which the base station includes an encoder, the base station operating according to the exemplary embodiment of FIG. 11 may include the same encoder as that of the terminal 1102. Accordingly, the base station 1101 may generate compressed bits using the same encoder as the terminal 1102, and then decompress the generated compressed bits by using a decoder to decompress the compressed bits again.

In addition, the base station 1101 may calculate gradients using the restored compressed bits and update parameters of the ML model. After updating the parameters of the ML model, the base station 1101 may transmit information on gradients to be updated in the encoder of the terminal 1002 (S1110).

The terminal 1112 receiving the parameters updated in step S1110 may update the parameter of the ML model (S1112).

The operation of transmitting the gradients and updating the ML model in steps S1110 and S1110 may occur in each channel measurement process or may be performed by transferring the accumulated gradients every predetermined number of times. As another method, since encoding and decoding are performed in the base station 1101 in the method described in FIG. 11, the information on the gradients to be updated in the encoder of the terminal 1102 may be transferred after all online learning processes are completed.

Figure 12:
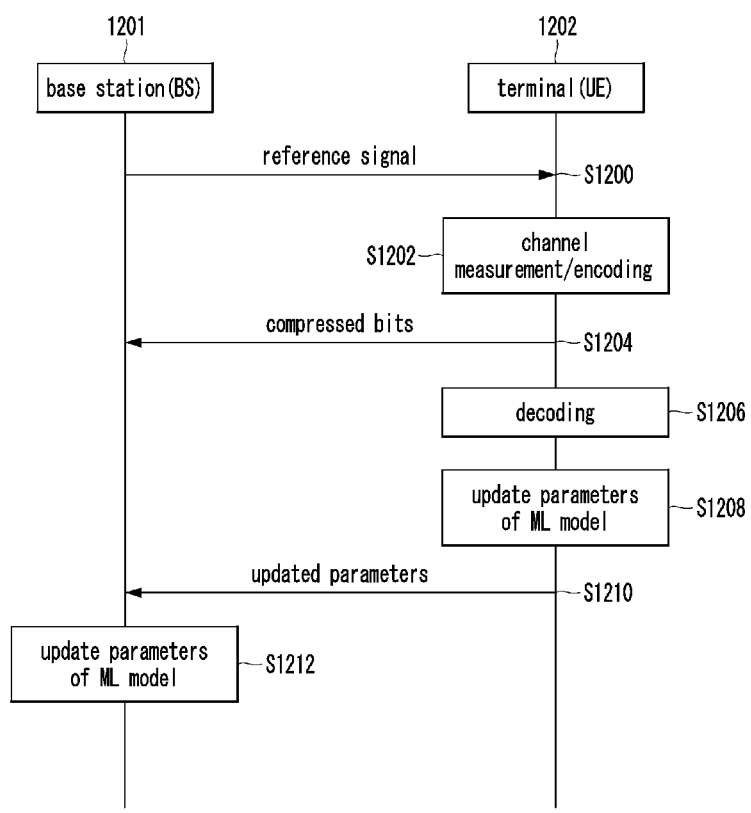
FIG. 12 is a signal flow diagram when updating parameters of an ML model according to another exemplary embodiment of the present disclosure.

FIG. 12 is a signal flow diagram when updating parameters of an ML model according to another exemplary embodiment of the present disclosure.

FIG. 12 illustrates a detailed procedure corresponding to step S950 of FIG. 9 described above. Referring to FIG. 12, a base station 1201 and a terminal 1202 may respectively include a decoder and an encoder based on the ML model described above, and may be in a state where the online training initiation of step S940 of FIG. 9 has been indicated.

In the two exemplary embodiments of online learning of FIGS. 10 and 11 described above, the terminal transmits the measured channel information to the base station. Since the channel information measured by the terminal may increase in size depending on a situation, it may be burdensome to directly transfer it through a radio channel. Therefore, in the exemplary embodiment of FIG. 12, a method in which the measured channel information is not transferred over the air may be used.

The base station 1201 may transmit a reference signal to the terminal 1202 (S1200). In this case, the reference signal may be a dedicated reference signal for parameter update of the ML model, or various types of reference signals used in the mobile communication system may be used. For example, a reference signal included in an SSB or CRS may be used. In addition, various other reference signals may be used.

Upon receiving the reference signal in step S1200, the terminal 1202 may measure a channel by using the received reference signal (S1202), and may generate compressed bits by encoding the measured channel information. Then, the terminal 1202 may transmit the compressed bits to the base station 1201 (S1204).

Thereafter, unlike the above-described exemplary embodiments of FIGS. 10 and 11, the terminal 1202 may perform decoding (S1206). In the exemplary embodiment of FIG. 12, the terminal 1202 performs both the functions of the encoder and the decoder. That is, this may correspond to a case in which the terminal 1202 performs the operation of the decoder instead of the base station 1201. Although the above-described drawings do not illustrate a form in which the terminal includes a decoder, the terminal operating according to the exemplary embodiment of FIG. 12 may include the same decoder as that of the base station.

Therefore, the terminal 1202 does not transmit the measured channel information. After calculating all gradients to be updated (S1208), the terminal may update the gradient parameters of the ML model, and transfer the updated parameters to the base station 1201 (S1210). In this case, when necessary, the terminal 1202 may transfer compressed bits generated by the encoder to the base station 1201 together with the updated parameters or through a separate channel.

Accordingly, the base station 1201 may receive the parameters updated in the terminal from the terminal 1202 (S1210). Then, the base station 1201 may update the parameters of the ML model (S1212).

Meanwhile, according to the description of FIGS. 9 to 12, a process in which the base station continuously transmits the reference signal for measurement to the terminal may be required for the online training (learning) process. In addition, according to a channel status information (CSI) framework defined in the 3GPP NR, a CSI reporting type is defined as being classified into three types: aperiodic, periodic, and semi-persistent.

The above-described measured channel information transmission may be performing by adding the measured channel information in a periodic CSI reporting process defined in the NR specification. Accordingly, the transmission of the measured channel information may be turned on or off or enabled by a trigger signal to perform the online learning process.

However, all three schemes of CSI reporting may not be suitable for the online learning process that requires transmitting a large number of reference signals within a short time. In addition, in the channel measurement of the online training process according to FIGS. 11 and 12 described above, the roles of the base station and the terminal may be different from those of the conventional scheme. In the case of FIG. 11, as described above, the base station performs the encoding operation instead of the terminal. On the other hand, in the case of FIG. 12, the terminal performs the decoding operation instead of the base station. Therefore, a transmission period for the online training may be required so that a plurality of reference signals are transmitted between the base station and the terminal, and measurement results for the reference signal and/or the updated parameters are transmitted within a short time.

Figure 13:
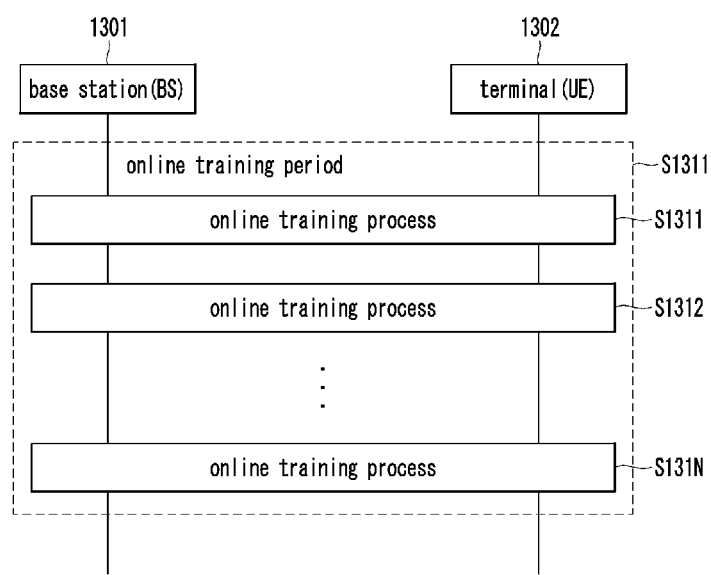
FIG. 13 is an exemplary diagram for describing a period in which online training is performed according to the present disclosure.

FIG. 13 is an exemplary diagram for describing a period in which online training is performed according to the present disclosure.

Referring to FIG. 13, one online training period in which online training processes are continuously performed between a base station 1301 and a terminal 1302 is exemplified. The online training period S1310 may be a predetermined time period. During the online training period S1310, a plurality of online training processes S1311, S1312, . . . , and S131N may be performed.

Each of the online training processes S1311, S1312, . . . , and S131N may be a process for updating at least one parameter of the ML model used between the base station 1301 and the terminal 1302. Accordingly, each of the online training processes S1311, S1312, . . . , and S131N may correspond to step S950 of performing the online training described in FIG. 9. As another example, one online training period S1310 may correspond to step S950 of performing the online training described with reference to FIG. 9.

In the case where one online training process corresponds to step S950 of performing the online training described with reference to FIG. 9, one online training process may include the procedure described with reference to FIGS. 10 to 12. In this case, the online training period may be determined in consideration of a periodicity at which the base station transmits the reference signal to the terminal. Even when it is stipulated to use a reference signal that is separately defined for the online training between the base station and the terminal, the online training period S1310 may be determined based on a transmission periodicity of the reference signal. As another example, when the existing reference signal defined in the mobile communication system (e.g., 3GPP NR system) is used, the online training period S1310 may be determined in consideration of a transmission periodicity of each reference signal.

Meanwhile, the procedures described above may be classified as a training process for determining parameters of the ML model to be applied to the encoder and the decoder used in the terminal and the base station.

In addition, an inference procedure may be required. In other words, after completing online training of the ML model, it may be necessary to measure the actual channel using the trained ML model.

The inference procedure may be similar to a process of using the existing 3GPP channel measurement resources, for example, a channel state information reference signal (CSI-RS). More specifically, the base station may transmit a predetermined number of CSI-RSs to the terminal. The terminal may receive the CSI-RSs transmitted from the base station, and measure channel information using the received CSI-RSs. The measured channel information may be compressed through an encoder trained online using one of the online learning methods of the ML model described above. The terminal may include compressed bits output from the trained encoder in CSI, and transmit it to the base station.

If the information compressed through the ML model is a channel matrix itself, a new field to inform the transmission of the channel matrix may need to be added to the CSI. The channel matrix itself may not be transmitted together with other information in the CSI. Therefore, a separate quantity for transmitting the channel matrix itself may need to be defined. If the information compressed through the ML model is a precoding matrix, the precoding matrix may be transmitted by replacing the existing PMI. In this case, only the corresponding part in the existing quantity (e.g., 'cri-RI-PMI-CQI') may be replaced. Such the quantity may be exemplified as follows.

TABLE 2

| Quantity | Description |
| --- | --- |
| Cri-AI | CSI-RS resource selection and compressed bits based on AI/ML method |
| Cri-RI-AI-CQI | CSI-RS resource selection, Rank Indication, compressed bits based on AI/ML method and Channel quality indication |

When the quantity is determined as exemplified in Table 2, the type of information to be transmitted and the amount of the information may be known. Therefore, when the terminal measures a CSI-RS received by the base station and reports CSI as a result, the quantity described in Table 2 may be additionally reported. In addition, the base station may identify how much information is transmitted from the terminal based on information on the quantity included in the CSI received from the terminal.

Using the methods described above, the base station and the terminal may determine the ML model to be used with each other. In addition, the parameters of the ML model may be updated based on the methods described with reference to FIGS. 9 to 12. Thereafter, the updated ML model may be used during communication between the base station and the terminal. That is, during communication between the base station and the terminal, the terminal may measure a channel transmitted by the base station, and report the measured result to the base station using the ML model. In particular, when at least one parameter is updated through online training, it is possible to provide more accurate channel information on an actual channel between the base station and the terminal. In addition, it is possible to reduce the overhead of transferring the channel information by using compressed bits based on the ML model.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a base station, comprising:
    determining one of machine learning (ML) models for receiving channel information for a channel to communicate with a terminal based on capability information of the terminal;
    providing configuration information of the determined ML model to the terminal;
    updating the determined ML model through online training with the terminal; and
    receiving channel information using the updated ML model from the terminal when communicating with the terminal,
    wherein the online training comprises:
        transmitting an online training request for the determined ML model to the terminal; and
        updating parameters of the determined ML model to update the determined ML model, and
    wherein the online training request instructs the terminal to initiate the online training when receiving an online training response indicating that the online training is possible from the terminal.

2. The method according to claim 1, wherein the capability information of the terminal includes at least one of whether the terminal supports use of the ML model, computation capability of the terminal, a memory size of the terminal, a current moving speed of the terminal, or combinations thereof.

3. The method according to claim 1, wherein the configuration information of the determined ML model is transmitted as at least one data packet.

4. The method according to claim 1, wherein the ML model is a model in which a decoder of the base station and an encoder of the terminal are connected as one pair.

5. The method according to claim 1, wherein the ML model is a model in which a decoder of the base station and decoders of one or more terminals including the terminal communicating with the base station are connected as a set.

6. The method according to claim 1, wherein the updating of the parameters comprises:
   transmitting a reference signal to the terminal;
   receiving, from the terminal, channel information measured based on the reference signal;
   receiving compressed bits for the channel information;
   decoding the compressed bits to obtain channel information;
   updating at least one parameter of the determined ML model based on the measured channel information and the obtained channel information; and
   transmitting the updated parameters to the terminal.

7. The method according to claim 1, wherein the updating of the parameters comprises:
   transmitting a reference signal to the terminal;
   receiving, from the terminal, channel information measured based on the reference signal;
   generating compressed bits based on the channel information through an encoder of the determined ML model;
   decoding the generated compressed bits by using a decoder of the determined ML model;
   updating at least one parameter of the ML model based on the decoded information and the measured channel information; and
   transmitting the updated parameter to the terminal.

8. The method according to claim 1, wherein the updating of the parameters comprises:
   transmitting a reference signal to the terminal;
   receiving, from the terminal, compressed bits corresponding to channel information measured based on the reference signal;
   receiving information on updated parameters for the determined ML model from the terminal; and
   updating the determined ML model by using the received information of the updated parameters.

9. A base station comprising:
   a transceiver configured to transmit and receive signals with at least one terminal by using an machine learning (ML) model; and
   at least one processor,
   wherein the at least one processor is executed to:
   determine one of ML models for receiving channel information for a channel to communicate with a terminal based on capability information of the terminal;
   provide configuration information of the determined ML model to the terminal through the transceiver;
   update the determined ML model through online training with the terminal; and
   receive channel information using the updated ML model from the terminal when communicating with the terminal,
   wherein in the online training, the at least one processor is further executed to:
   transmit an online training request for the determined ML model to the terminal through the transceiver and
   update parameters of the determined ML model to update the determined ML model, and
   wherein the online training request instructs the terminal to initiate the online training when receiving an online training response indicating that the online training is possible from the terminal.

10. The base station according to claim 9, wherein the capability information of the terminal includes at least one of whether the terminal supports use of the ML model, computation capability of the terminal, a memory size of the terminal, a current moving speed of the terminal, or combinations thereof.

11. The base station according to claim 9, wherein the configuration information of the determined ML model is transmitted as at least one data packet.

12. The base station according to claim 9, wherein the ML model is a model in which a decoder of the base station and an encoder of the terminal are connected as one pair.

13. The base station according to claim 9, wherein the ML model is a model in which a decoder of the base station and decoders of one or more terminals including the terminal communicating with the base station are connected as a set.

14. The base station according to claim 9, wherein in the updating of the parameters, the at least one processor is further executed to:
   transmit a reference signal to the terminal through the transceiver;
   receive, from the terminal, channel information measured based on the reference signal;
   receive compressed bits for the channel information;
   decode the compressed bits to obtain channel information;
   update at least one parameter of the determined ML model based on the measured channel information and the obtained channel information; and
   transmit the updated parameters to the terminal.

15. The base station according to claim 9, wherein in the updating of the parameters, the at least one processor is further executed to:
   transmit a reference signal to the terminal through the transceiver;
   receive, from the terminal, channel information measured based on the reference signal;
   generate compressed bits based on the channel information through an encoder of the determined ML model;
   decode the generated compressed bits by using a decoder of the determined ML model;
   update at least one parameter of the determined ML model based on the decoded information and the measured channel information; and
   transmit the updated parameter to the terminal.

16. The base station according to claim 9, wherein in the updating of the parameters, the at least one processor is further executed to:
   transmit a reference signal to the terminal through the transceiver;
   receive, from the terminal, compressed bits corresponding to channel information measured based on the reference signal;
   receive information on updated parameters for the determined ML model from the terminal; and
   update the determined ML model by using the received information of the updated parameters.

17. A method of a terminal, comprising:
   configuring an machine learning (ML) model to be used for communication with a base station based on configuration information of the ML model received from the base station;

updating the ML model through online training with the base station;

measuring channel information during communication with the base station;

generating compressed bits corresponding to the measured channel information by using the updated ML model; and transmitting the generated compressed bits to the base station, wherein the online training comprises:

receiving an online training request for the determined ML model form the base station;

initiating the online training when transmitting an online training response indicating that the online training is possible to the base station, in response to receiving the online training request; and updating parameters of the determined ML model to update the determined ML model.

18. The method according to claim 17, further comprising, when requested by the base station, transmitting capability information of the terminal, the capability information including at least one of whether the terminal supports use of the ML model, computation capability of the terminal, a memory size of the terminal, a current moving speed of the terminal, or combinations thereof.

* * * * *